US011582677B2

United States Patent
Baek et al.

(10) Patent No.: US 11,582,677 B2
(45) Date of Patent: *Feb. 14, 2023

(54) METHOD AND APPARATUS FOR TERMINATING CELLULAR NETWORK CONNECTION OF UNAUTHENTICATED TERMINAL

(71) Applicant: Samsung Electronics Co., Ltd., Suwon-si (KR)

(72) Inventors: Youngkyo Baek, Suwon-si (KR); Sunghoon Kim, Suwon-si (KR); Jungje Son, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 114 days.

This patent is subject to a terminal disclaimer.

(21) Appl. No.: 17/092,734

(22) Filed: Nov. 9, 2020

(65) Prior Publication Data

US 2021/0058848 A1 Feb. 25, 2021

Related U.S. Application Data

(63) Continuation of application No. 16/368,045, filed on Mar. 28, 2019, now Pat. No. 10,863,416.

(30) Foreign Application Priority Data

Mar. 30, 2018 (KR) .................. 10-2018-0037402

(51) Int. Cl.
*H04W 48/02* (2009.01)
*H04W 36/00* (2009.01)
(Continued)

(52) U.S. Cl.
CPC ............. *H04W 48/02* (2013.01); *H04W 8/08* (2013.01); *H04W 36/0022* (2013.01); *H04W 60/00* (2013.01); *H04W 88/16* (2013.01)

(58) Field of Classification Search
None
See application file for complete search history.

(56) References Cited

U.S. PATENT DOCUMENTS

| 2015/0118999 | A1 | 4/2015 | Merchant |
| 2016/0210578 | A1 | 7/2016 | Raleigh et al. |

(Continued)

FOREIGN PATENT DOCUMENTS

| KR | 10-2017-0112552 A | 10/2017 |
| KR | 10-2018-0005134 A | 1/2018 |

(Continued)

OTHER PUBLICATIONS

'3GPP; TSGSA; Study on System enhancements for Provision of Access to Restricted Local Operator Services by Unauthenticated UEs (Release 15)', 3GPP TR 23.715 V0.2.0, Feb. 19, 2018, See section 6.2.,Valbonne , FRANCE.

(Continued)

*Primary Examiner* — Saumit Shah
(74) *Attorney, Agent, or Firm* — Jefferson IP Law, LLP

(57) ABSTRACT

A method and an apparatus for terminating a cellular network connection of a terminal that is connected without authentication are provided. The disclosure relates to a communication technique and a system for fusing a 4th generation (4G) system and a 5th generation (5G) communication system to support higher data rates, which is subsequent to the 4G system, with Internet-of-things (IoT) technology. The disclosure may be applied to intelligent services (e.g., smart home, smart buildings, smart cities, smart cars or connected cars, healthcare, digital education, retail business, security and safe-related services, or the like) based on 5G communication technology and IoT-related technology.

16 Claims, 9 Drawing Sheets

(51) Int. Cl.
*H04W 60/00* (2009.01)
*H04W 8/08* (2009.01)
*H04W 88/16* (2009.01)

(56) References Cited

U.S. PATENT DOCUMENTS

| | | | |
|---|---|---|---|
| 2018/0014178 A1 | 1/2018 | Baek et al. | |
| 2018/0220479 A1 | 8/2018 | Shu et al. | |
| 2018/0288680 A1 | 10/2018 | Yamada | |
| 2018/0332457 A1 | 11/2018 | Thiebaut et al. | |
| 2019/0053049 A1 | 2/2019 | Kunuz et al. | |
| 2019/0053328 A1 | 2/2019 | Kunz et al. | |
| 2019/0253952 A1 | 8/2019 | Kumar et al. | |
| 2019/0342940 A1* | 11/2019 | Ryu | H04W 60/00 |
| 2020/0077356 A1* | 3/2020 | Youn | H04W 76/27 |

FOREIGN PATENT DOCUMENTS

| | | |
|---|---|---|
| WO | 2017/076986 A1 | 5/2017 |
| WO | 2019/030567 A1 | 2/2019 |

OTHER PUBLICATIONS

SA1, 'LS on clarification on Restricted Operator Services', S1-180279, 3GPP TSG-SA WG1 Meeting #81, Feb. 5-9, 2018, See section 1., Fukuoka, Japan.
International Search Report dated Jul. 4, 2019, issued in International Patent Application No. PCT/KR2019/003649.
Ericsson et al.; Support for Restricted Local Operator Services in EPC; 3GPP TSG-SA WG2 Meeting #130; S2-1901076; Jan. 21-25, 2019; Kochi, India.
Extended European Search Report dated Mar. 31, 2021, issued in a counterpart European Application No. 19774290.1-1215/3759967.
"3rd Generation Partnership Project; Technical Specification Group Services and System Aspects; Study on System enhancements for Provision of Access to Restricted Local Operator Services by Unauthenticated UEs (Release 15)", 3GPP Draft; 23715-030_RM, 3rd Generation Partnership Project (3GPP), Mobile Competence Centre; 650, Route Des Lucioles; F-06921 Sophia-Antipolis Cedex; France, Mar. 22, 2018, XP051420312.
Nokia et al: "23.715: Solution: IMS procedures for RLOS", 3GPP Draft; S2-181729_PCR23715 RLOS SOL IMS Procedures_V1, 3rd Generation Partnership Project (3GPP), Mobile Competence Centre; 650, Route Des Lucioles; F-06921 Sophia-Antipolis Cedex; France, vol. SA WG2, No. XP051408326; Feb. 20, 2018, Montreal, Canada.

* cited by examiner

METHOD AND APPARATUS FOR TERMINATING CELLULAR NETWORK CONNECTION OF UNAUTHENTICATED TERMINAL

CROSS-REFERENCE TO RELATED APPLICATION(S)

This application is a continuation application of prior application Ser. No. 16/368,045, filed on Mar. 28, 2019, which is based on and claims priority under 35 U.S.C. 119(a) of a Korean patent application number 10-2018-0037402, filed on Mar. 30, 2018, in the Korean Intellectual Property Office, the disclosure of which is incorporated by reference herein in its entirety.

BACKGROUND

1. Field

The disclosure relates to a method and an apparatus for terminating a cellular network connection of a terminal that is connected without authentication.

2. Description of Related Art

In general, a mobile communication system has been developed for the purpose of providing communication while ensuring the mobility of a user. The remarkable development of technology of the mobile communication system has brought high-speed data communication services as well as voice communication.

In recent years, standardization for a long-term evolution (LTE) system (evolved packet system (EPS) and 4th generation (4G) system), as a next generation mobile communication system, has been processed by 3rd generation partnership project (3GPP). The LTE system is a technology for implementing high-speed packet-based communication with a transfer rate of up to about 100 Mbps higher than the data rate currently provided and is being standardized for commercialization by 2010.

In addition, in order to meet a growing demand for wireless data traffic after commercialization of 4G communication systems, efforts are underway to develop improved 5th generation (5G) communication systems or pre-5G communication systems. For this reason, 5G communication systems or pre-5G communication systems are referred to as "beyond-4G network communication systems" or "post-LTE systems."

In order to achieve a high data rate, implementation of 5G communication systems in super-high frequency (mm Wave) bands (e.g., a band of 60 GHz) is being taken into consideration. In order to mitigate the path loss of radio waves and in order to increase the propagation distance of radio waves in super-high frequency bands, technologies, such as beamforming, massive multiple-input and multiple-output (MIMO), full-dimensional MIMO (FD-MIMO), array antennas, analog beamforming, and large scale antennas, are being discussed in 5G communication systems.

Further, in order to improve the network of a system, technologies, such as evolved small cells, advanced small cells, a cloud radio access network (cloud radio access network (RAN)), an ultra-dense network, device-to-device (D2D) communication, wireless backhaul, moving networks, cooperative communication, coordinated multi-points (CoMP), interference cancellation, and the like, are being developed in 5G communication systems. In addition, in 5G systems, advanced coding modulation (ACM) schemes, such as hybrid frequency-shift keying (FSK) and quadrature amplitude modulation (QAM) (FQAM) and sliding window superposition coding (SWSC), and advanced connection technologies, such as filter bank multi-carrier (FBMC), non-orthogonal multiple access (NOMA), and sparse code multiple access (SCMA), are being developed.

Meanwhile, the Internet is evolving from a human-centered network, in which humans produce and consume information, into an Internet-of-things (IoT) network in which distributed components, such as things, exchange information with each other and process the same. Internet-of-everything (IoE) technology, which combines IoT technology with big-data processing technology through connection with cloud servers or the like, is also emerging. In order to implement IoT, technology elements, such as sensing technology, wired/wireless communication and network infrastructure, service interface technology, security technology, or the like, are required. Thus, in recent years, technologies for connecting things, such as a sensor network, machine-to-machine (M2M) communication, machine-type communication (MTC), or the like, have been studied. The IoT environment may provide intelligent Internet technology services that collect and analyze data produced from connected things, thereby creating new value in human life. The IoT may be applied to the fields of smart homes, smart buildings, smart cities, smart cars or connected cars, smart grids, health care, smart home appliances, and advanced medical services through fusion and combination between the existing information technology (IT) and various kinds of industries.

Accordingly, various attempts have been made in order to apply the 5G communication system to the IoT network. For example, technologies, such as a sensor network, M2M communication, MTC, or the like, have been implemented by means of 5G communication techniques such as beamforming, MIMO, array antennas, or the like. The application of the cloud RAN, as the big-data processing technology described above, may be an example of the fusion of 5G technology and IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for releasing a terminal, which has no subscriber identification module (SIM) profile, such as an open market terminal equipped with an embedded SIM (eSIM), is allowed to connect to a cellular network without authentication, and is provided with restricted local operator services (RLOS) by the provider, from the network at an appropriate time, unlike normal terminals connected to the cellular network. In addition, it is another aspect of the disclosure to provide a method of providing the terminal with information on how long the service will be available or information on when the service will expire and of terminating the connection of the terminal when the service is unavailable.

The technical problems to be solved by the disclosure are not limited to the above-mentioned technical problems, and other technical problems, which are not mentioned, will be clearly understood by those skilled in the art from the description below.

Additional aspects will be set forth in part in the description which follows and, in part, will be apparent from the description, or may be learned by practice of the presented embodiments.

In accordance with an aspect of the disclosure, a method of a gateway (GW) in a wireless communication system is provided. The method includes configuring a packet data network (PDN) connection for restricted local operator services (RLOS), determining whether an expiration condition of the RLOS is satisfied, and deactivating the PDN connection for the ROLS, in case that the expiration condition of the RLOS is satisfied.

In one embodiment, the configuring the PDN connection for the RLOS comprises receiving, from a mobility management entity (MME), a first message for configuring the PDN connection for the RLOS, configuring the PDN connection for the RLOS, and transmitting, to the MME, a second message in response to the configuring of the PDN connection for the RLOS.

In one embodiment, the method further comprises configuring the expiration condition of the RLOS for the PDN connection.

In one embodiment, the expiration condition for the RLOS includes a preconfigured period time for the RLOS.

In accordance with another aspect of the disclosure, a method of a terminal in a wireless communication system is provided. The method includes configuring a packet data network (PDN) connection for restricted local operator services (RLOS), and deactivating the PDN connection for the ROLS, in case that an expiration condition of the RLOS being satisfied is determined by a gateway (GW).

In one embodiment, the configuring the PDN connection for the RLOS comprises transmitting, to a mobility management entity (MME), a first message for configuring the PDN connection for the RLOS, and receiving, from the MME, a second message in response to the configuring of the PDN connection for the RLOS.

In one embodiment, the method further comprises receiving, from a mobility management entity (MME), the expiration condition of the RLOS for the PDN connection.

In one embodiment, the expiration condition for the RLOS includes a preconfigured period time for the RLOS.

In accordance with another aspect of the disclosure, a gateway (GW) in a wireless communication system is provided. The GW includes a transceiver, and a controller configured to configure a packet data network (PDN) connection for restricted local operator services (RLOS), determine whether an expiration condition of the RLOS is satisfied, and deactivate the PDN connection for the ROLS, in case that the expiration condition of the RLOS is satisfied.

In accordance with another aspect of the disclosure, a terminal in a wireless communication system is provided. The terminal includes a transceiver, and a controller configured to configure a packet data network (PDN) connection for restricted local operator services (RLOS), and deactivate the PDN connection for the ROLS, in case that an expiration condition of the RLOS being satisfied is determined by a gateway (GW).

An embodiment of the disclosure can provide a method of notifying a terminal connected to the network without authentication of conditions for terminating the connection and a method of releasing the connection of the terminal from the network according to the connection termination condition. In addition, an embodiment of the disclosure can provide a method of preventing an unauthenticated terminal from unnecessarily and continuously accessing the network and allowing the terminal or the user to request connection extension as necessary, thereby enabling efficient management of the connection resources of a cellular network with respect to the unauthenticated terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
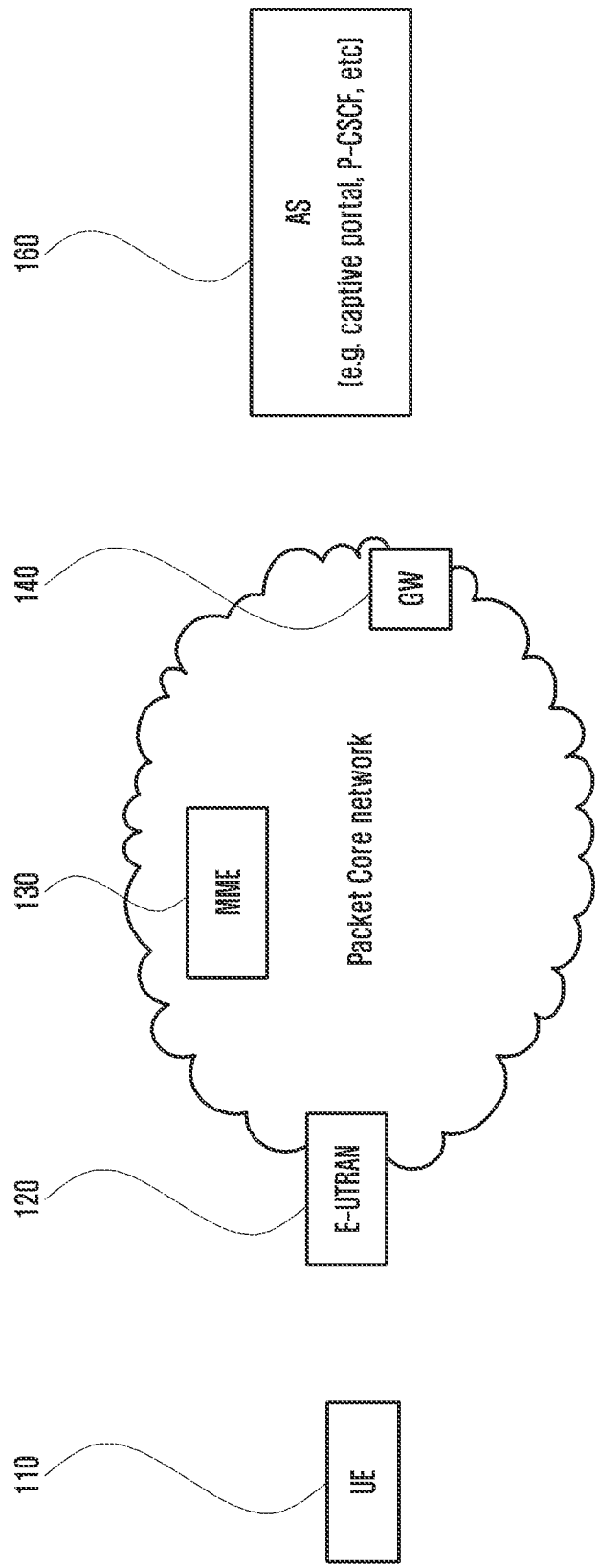
FIG. 1 is a view illustrating a structure of a cellular network for serving an unauthenticated terminal according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" divided into a larger number of elements, "unit." Moreover, the elements and "units" or "modules" may be implemented to reproduce one or more central processing units (CPUs) within a device or a security multimedia card. Further, in the embodiments, the "unit" may include at least one processor.

In order to provide a subscriber identification module (SIM) profile to a terminal that has no SIM profile, such as an open market terminal equipped with an embedded SIM (eSIM), a method of providing restricted services to the terminal that has no SIM profile by allowing the terminal to access a cellular network is under discussion. In this case, the terminal connected to the network may be provided with services, such as SIM provisioning, internet protocol (IP) multimedia core network subsystem (IMS) voice calls, or the like, from the provider through restricted local operator services (RLOS).

If the connection with the terminal is continuously maintained, there may be a burden on the processing capacity of the network and a threat to security. Therefore, unlike an ordinary terminal connected to the cellular network through a user services identity module (USIM), a method for releasing the unauthenticated terminal from the network at an appropriate time is required.

FIG. 1 is a view illustrating a structure of a cellular network for serving an unauthenticated terminal according to an embodiment of the disclosure.

Referring to FIG. 1, for RLOS, a terminal (e.g., user equipment (UE)) 110 may select a network providing the RLOS, and may access the same. The terminal 110 may secure connectivity without an authentication process when accessing a packet core network, and then may be provided with the RLOS from the provider.

The packet core network to which the terminal 110 connects in order to secure connectivity may be, for example, a cellular network providing data communication, such as an evolved packet system (EPS) providing LTE network services or a 5G system network. There is a mobility management (MM) functional entity for mobility management of the terminal and a session management (SM) functional entity for session management, which process signaling messages.

In the case of the EPS, as shown in FIG. 1, a mobility management entity (MME) 130 serves as the MM functional entity and the SM functional entity. The MME 130 may select a gate way (GW) 140 providing the RLOS for the terminal 110 connected for the RLOS, and the terminal 110 may connect to an application server (AS) 160 via the GW 140 through a limited connectivity service. For example, the AS 160 may be a captive portal, or may be a proxy-call session control function (P-CSCF) in the case of an IMS service. In a 5G system network, an access and mobility management function (AMF) serves as the MM functional entity, and a session management function (SMF) serves as the SM functional entity and a control plane of the GW. A user plane function (UPF) plays the role corresponding to the user plane of the GW. A policy and charging rules function (PCRF) corresponds to a policy control function (PCF). Therefore, it should be understood that the embodiments mentioned in the disclosure can be applied to a 5G system network, as well as the EPS network.

For example, in the case where the embodiments are applied to 5GS, the evolved universal terrestrial radio access network (E-UTRAN) 120 may be interpreted as a 5G-radio access network (RAN), the mobility management operation of the MME 130 may be interpreted as an AMF, the session management operation of the MME 130 and the control plane operation of the GW 140 may be interpreted as an SMF, the user plane operation of the GW 140 may be interpreted as a UPF, and the PCRF may be interpreted as a PCF in the respective embodiments. The mobility management operation of the MME 130 refers to an operation of determining whether or not it corresponds to the RLOS and selecting the GW 140 for the RLOS (the SMF in 5G system network) without an authentication process. The session management operation of the MME 130 may refer to an operation of processing sessions, such as create-session request, session modification, EPS bearer activation, modification thereof, or the like, and the control plane operation of the GW 140 may refer to an operation of creating expiration conditions, traffic flow template (TFT), or the like in the case of the RLOS and providing corresponding information to the user plane of the GW 140.

Figure 2:
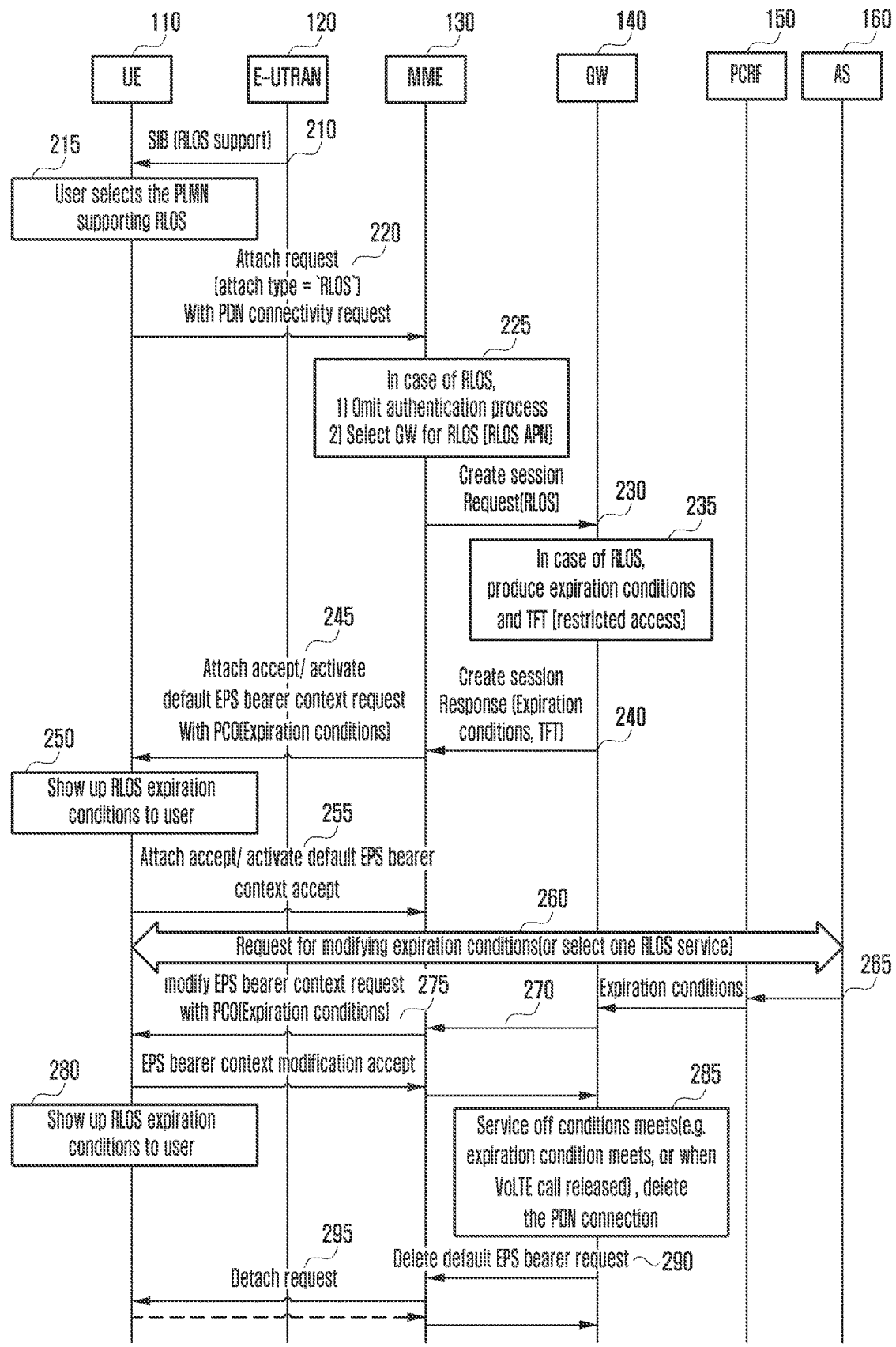
FIG. 2 is a view illustrating a method of informing an unauthenticated terminal of connection termination conditions through a protocol configuration option (PCO) and terminating a connection of the terminal if the connection termination conditions are satisfied according to an embodiment of the disclosure.

FIG. 2 is a view illustrating a method of informing an unauthenticated terminal of connection termination conditions through a protocol configuration option (PCO) and terminating a connection of the terminal if the connection termination conditions are satisfied according to an embodiment of the disclosure.

FIG. 2 shows a process of informing the terminal 110 connected without authentication of connection termination conditions and terminating connection of the terminal 110 if the connection termination conditions are satisfied according to an embodiment.

Referring to FIG. 2, the E-UTRAN (e.g., eNB, gNB, base station, or the like) 120 broadcasts information indicating the RLOS support using a system information block (SIB) message if the RLOS is available, at operation 210. Upon receiving the SIB message, the terminal 110 selects an appropriate public land mobile network (PLMN) from among the detected available PLMNs supporting the RLOS if the RLOS is required, at operation 215.

The terminal 110 transmits an attach-request message to the MME 130 using the selected PLMN, and requests a network connection while informing that the attach-type is the RLOS, at operation 220. For example, "attach type='RLOS'" may be used. In this case, the attach-request message may include the identity of the terminal 110 (e.g., international mobile station equipment identity (IMEI)). The terminal 110 may transmit a PDN connectivity request included in the attach-request message as a piggyback.

The MME 130 may use the IMEI in order to determine whether or not the terminal 110 transmitting the attach-request message is eligible for the RLOS. A method in which the MME 130 determines whether or not the terminal 110 is eligible for the RLOS using the IMEI will be described as a separate embodiment.

If the attach-request message relates to the RLOS, the MME 130, which has received the attach-request message, selects the GW 140 for the RLOS without an authentication/authorization process for security, at operation 225. The MME 130 transmits a create-session request to the GW 140 selected for the RLOS, thereby making a request for establishing a PDN connection, at operation 230. In this case, the create-session request message includes an RLOS access point name (APN) or an indication stating that it is for the RLOS. Upon receiving the create-session request, the GW 140 may allocate an IP address, and may produce default EPS bearer context. The default EPS bearer may be configured to produce a TFT such that the terminal 110 can use the traffic only for the RLOS and thus can communicate with a specific server, at operation 235. In addition, expiration conditions for the RLOS to be provided to the terminal 110 may be acquired on the basis of a value predetermined in the GW 140 or a value received from a PCRF 150. The expiration conditions for the RLOS may include all or some of, for example, an allowed service time indicating how long the RLOS is available, an allowed service volume indicating how much data can be transmitted, or an allowed inactivity period indicating how long the RLOS can last since the last data transmission/reception to/from the terminal 110.

If the GW 140 transmits the expiration conditions for the RLOS to the MME 130, at operation 240, the MME 130 performs the remaining PDN connection establishment process and attachment process so as to include the received expiration conditions for the RLOS in the PCO of an activate-default EPS bearer context request message, at operation 245, and so as to transmit the same together with an attach-accept message, thereby establishing a PDN connection and completing the attachment process via operations 245 and 255. Upon receiving the expiration conditions for the RLOS included in the PCO, the terminal 110 notifies the user of the expiration conditions for the RLOS through a display of the terminal 110, at operation 250.

Meanwhile, if the user makes a request for updating the expiration conditions for the RLOS while the terminal 110 accesses the RLOS via the established PDN connection and is served (for example, if the user wishes to extend the service period or wishes to modify an available volume through a captive portal server), the terminal 110 makes a request to the AS 160 for the RLOS for updating the conditions, at operation 260. Then, the AS 160 for the RLOS, which received the request, transmits modified expiration conditions for the RLOS to the PCRF 150, and the PCRF 150 updates the modified expiration conditions for the RLOS with respect to the GW 140, at operation 265.

Alternatively, when the terminal 110 connects, for the RLOS, to the AS 160 for the RLOS through the established PDN connection and the user selects one of various RLOSs provided by the provider, the expiration conditions for the RLOS will vary with the selected RLOS. That is, an allowed service time indicating how long the RLOS is available, an allowed service volume indicating how much data can be transmitted, or an allowed inactivity period indicating how long the RLOS can last since the last data transmission/reception to/from the terminal 110 may be set to be different in values from each other. To this end, the AS 160 transmits, to the PCRF 150, the expiration conditions for the RLOS determined according to the selection, and the PCRF 150 updates the modified expiration conditions for the RLOS with respect to the GW 140, at operation 265.

Upon receiving the modified expiration conditions for the RLOS, the GW 140 requests modification of the session in order to transmit the received conditions to the terminal 110 through the PCO and includes the modified expiration conditions for the RLOS in the PCO of an SM network attached storage (NAS) message (e.g., modify-EPS bearer context request message) to thus transmit the same via the MME 130, at operations 270 and 275. Upon receiving the PCO, the terminal 110 notifies the user of the expiration conditions for the RLOS through a display of the terminal 110, at operation 280.

The GW 140 monitors the user usage status according to the expiration conditions for the RLOS. For example, if the allowed service time is set, the GW 140 determines, through a timer, whether or not the allowed service time has expired; if the allowed service volume is set, the GW 140 determines whether or not the usage amount of the terminal 110 exceeds the allowed service volume; and if the allowed inactivity period is set, the GW 140 determines whether or not the elapsed time since the last data transmission/reception exceeds the allowed inactivity period, thereby continuously checking whether or not the expiration conditions for the RLOS are satisfied.

If the expiration conditions for the RLOS are not satisfied, or if the GW 140 recognizes that a voice over LTE (VoLTE) call of the terminal 110 using the VoLTE service through the RLOS has been terminated, the GW 140 performs a process of terminating the RLOS for the terminal 110, at operation 285. The GW 140 may recognize that the VoLTE call has been terminated if data is no longer transmitted to the corresponding QCI=1 bearer for a specific period of time or if a message instructing to delete the QCI=1 bearer due to the call termination is received from the PCRF 150.

In order to terminate the RLOS for the terminal 110, the GW 140 transmits, to the MME 130, a delete-default EPS bearer request in relation to the PDN connection for the RLOS, at operation 290, and if it is identified that the terminal 110 has one PDN connection, the MME 130 transmits a detach-request message, at operation 295, to the terminal 110, thereby terminating the connection of the terminal 110.

Figure 3:
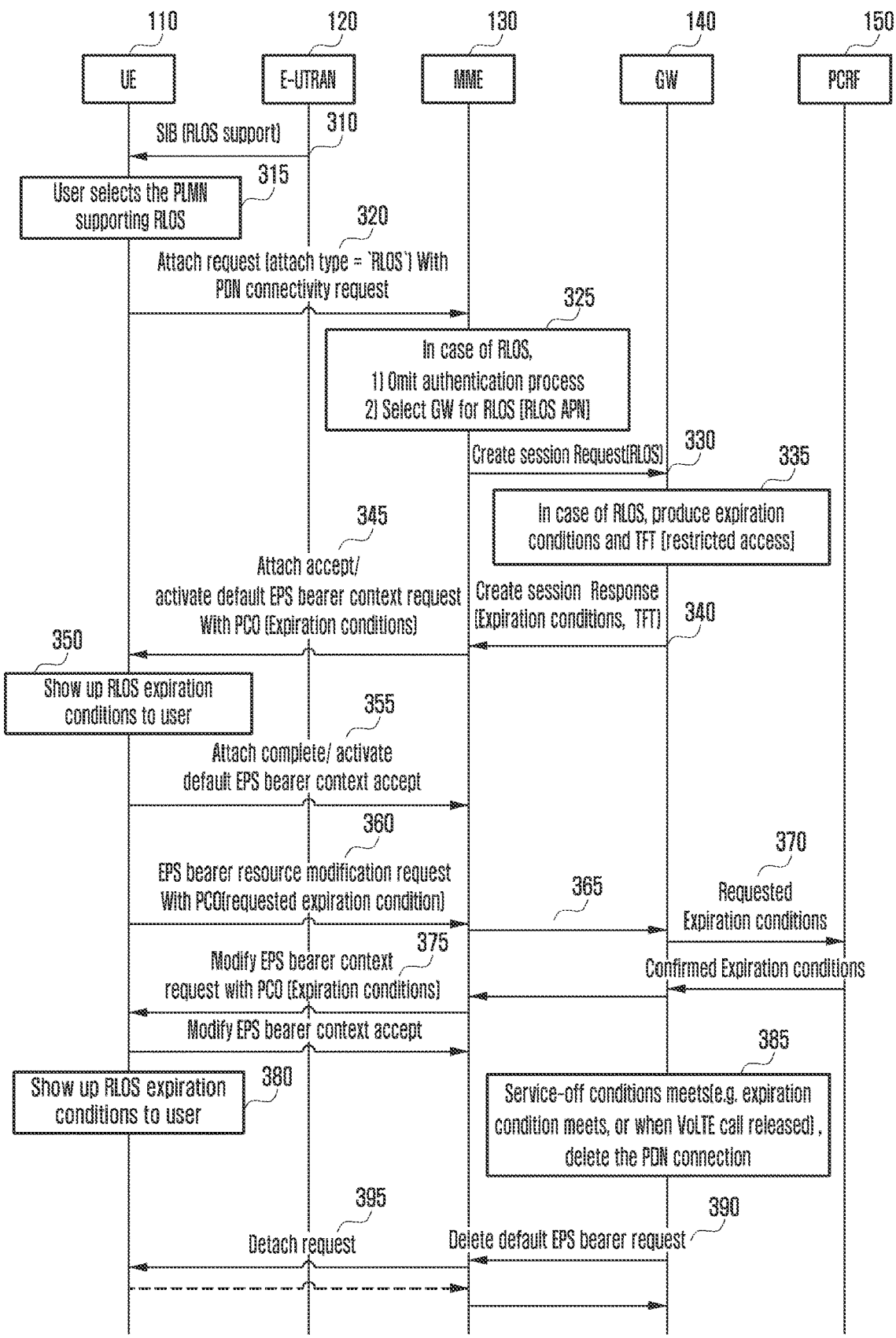
FIG. 3 is a view illustrating a method of informing an unauthenticated terminal of connection termination conditions through a PCO and terminating a connection of the terminal if the connection termination conditions are satisfied according to an embodiment of the disclosure.

FIG. 3 is a view illustrating a method of informing an unauthenticated terminal of connection termination conditions through a PCO and terminating a connection of the terminal if the connection termination conditions are satisfied according to an embodiment of the disclosure.

FIG. 3 shows a process of informing the terminal 110 connected without authentication of connection termination conditions and terminating connection of the terminal 110 if the conditions are satisfied according to an embodiment.

Referring to FIG. 3, the E-UTRAN 120 broadcasts information indicating the RLOS support using an SIB message if the RLOS is available, at operation 310. Upon receiving the SIB message, the terminal 110 selects an appropriate PLMN from among the detected available PLMNs supporting the RLOS if the RLOS is required, at operation 315.

The terminal 110 transmits an attach-request message to the MME 130 using the selected PLMN, and requests the network connection while informing that the attach-type is the RLOS, at operation 320. For example, "attach type='RLOS'" may be used. In this case, the attach-request message may include the identity of the terminal 110 (e.g., IMEI). The terminal 110 may transmit a PDN connectivity request included in the attach-request message as a piggyback.

The MME 130 may use the IMEI in order to determine whether or not the terminal 110 sending the attach-request message is eligible for the RLOS. A method in which the MME 130 determines whether or not the terminal 110 is eligible for the RLOS using the IMEI will be described as a separate embodiment.

If the attach-request message relates to the RLOS, the MME 130, which has received the attach-request message, selects the GW 140 for the RLOS without an authentication/authorization process for security, at operation 325. The MME 130 transmits a create-session request to the GW 140 selected for the RLOS, thereby making a request for establishing a PDN connection, at operation 330. In this case, the create-session request message includes an RLOS APN or an indication stating that it is for the RLOS. Upon receiving the create-session request, the GW 140 may allocate an IP address, and may produce default EPS bearer context. The default EPS bearer may be configured to produce a TFT so that the terminal 110 can use the traffic only for the RLOS and thus can communicate with a specific server, at operation 335. In addition, expiration conditions for the RLOS to be provided to the terminal 110 may be acquired on the basis of a value predetermined in the GW 140 or a value received from the PCRF 150. The expiration conditions for the RLOS may include all or some of, for example, an allowed service time indicating how long the RLOS is available, an allowed service volume indicating how much data can be transmitted, or an allowed inactivity period indicating how long the RLOS can last since the last data transmission/reception to/from the terminal 110.

If the GW 140 transmits the expiration conditions for the RLOS to the MME 130, at operation 340, the MME 130 performs the remaining PDN connection establishment process and attachment process so as to include the received expiration conditions for the RLOS in the PCO of an activate-default EPS bearer context request message, at operation 345, and so as to transmit the same together with an attach-accept message, thereby establishing a PDN connection and completing the attachment process via operations 345 and 355. Upon receiving the expiration conditions for the RLOS contained in the PCO, the terminal 110 notifies the user of the expiration conditions for the RLOS through a display of the terminal 110, at operation 350.

Meanwhile, if the user makes a request for updating the expiration conditions for the RLOS while the terminal 110 accesses the RLOS via the established PDN connection and is served, the terminal 110 produces an expiration condition proposal for the modified RLOS to be requested, and includes the expiration condition proposal for the modified RLOS in the PCO of an SM NAS message (e.g., EPS bearer resource modification request message), thereby transmitting the same to the MME 130, at operation 360. Upon receiving the NAS message, the MME 130 transfers the corresponding PCO to the GW 140, at operation 365, and the GW 140 directly identifies whether or not the expiration condition proposal for the RLOS requested by the terminal 110 is acceptable or enquires the PCRF 150 of the expiration condition proposal, thereby determining whether or not to accept the expiration condition proposal, at operation 370. In addition, the GW 140 includes the determined expiration conditions for the RLOS in the PCO of a modify-EPS bearer context request message to thus transmit the same to the terminal 110 via the MME 130, at operation 375.

Upon receiving the PCO, the terminal 110 notifies the user of the expiration conditions for the RLOS through a display of the terminal 110, at operation 380.

The GW 140 monitors the user usage status according to the expiration conditions for the RLOS. For example, if the allowed service time is set, the GW 140 determines, through a timer, whether or not the allowed service time has expired; if the allowed service volume is set, the GW 140 determines whether or not the usage amount of the terminal 110 exceeds the allowed service volume; and if the allowed inactivity period is set, the GW 140 determines whether or not the elapsed time since the last data transmission/reception exceeds the allowed inactivity period, thereby continuously checking whether or not the expiration conditions for the RLOS are satisfied.

If the expiration conditions for the RLOS are not satisfied, or if the GW 140 recognizes that the VoLTE call of the terminal 110 using the VoLTE service through the RLOS has been terminated, the GW 140 performs a process of terminating the RLOS for the terminal 110, at operation 385. The GW 140 may recognize that the VoLTE call has been terminated if data is no longer transmitted to the corresponding QCI=1 bearer for a specific period of time, or if a message instructing to delete the QCI=1 bearer due to the call termination is received from the PCRF 150.

In order to terminate the RLOS for the terminal 110, the GW 140 transmits, to the MME 130, a delete-default EPS bearer request in relation to the PDN connection for the RLOS, at operation 390, and if it is identified that the terminal 110 has one PDN connection, the MME 130 transmits a detach-request message, at operation 395, to the terminal 110, thereby terminating the connection of the terminal 110.

Figure 4:
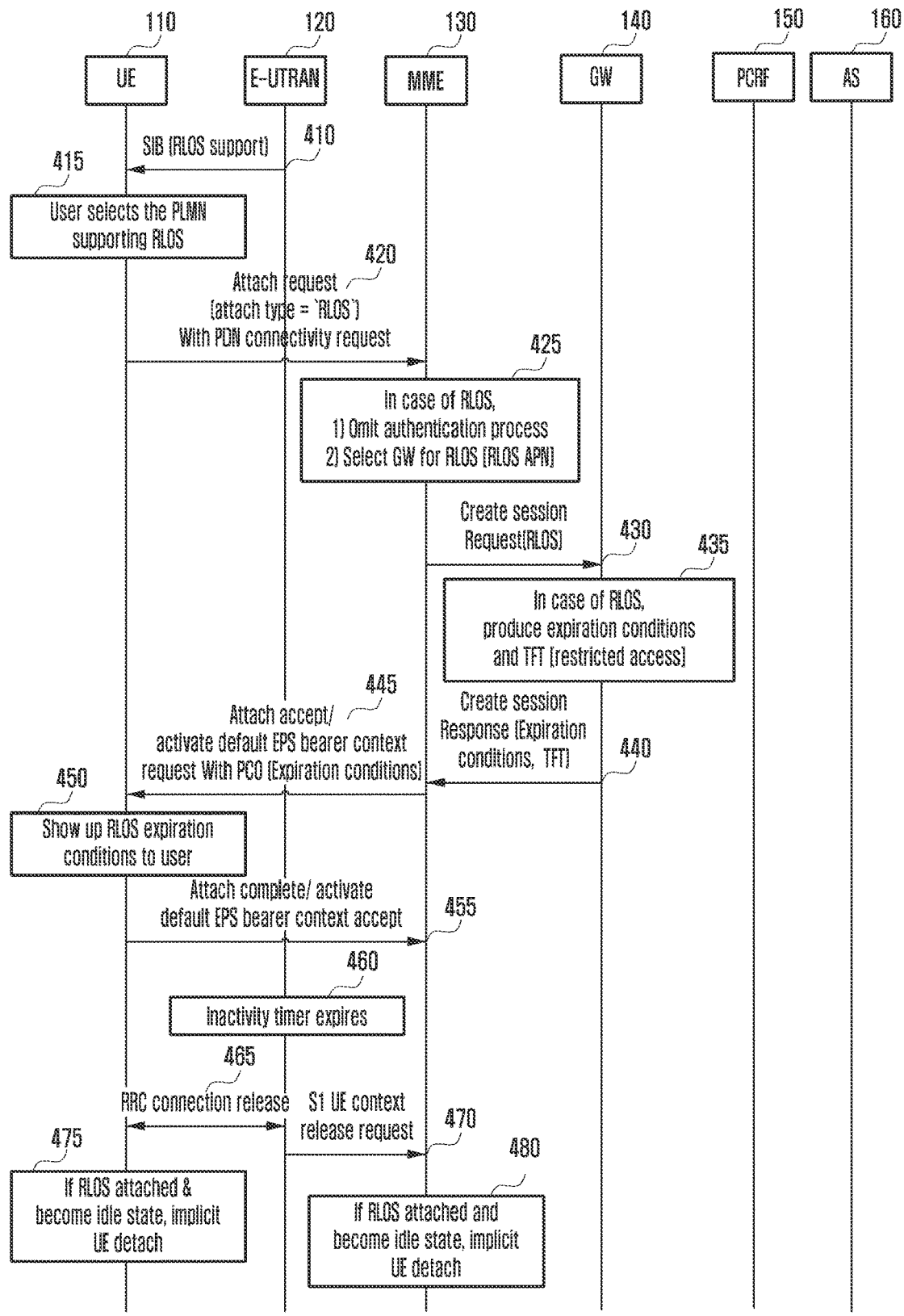
FIG. 4 is a view illustrating a method of terminating a connection of an unauthenticated terminal if the terminal switches to an idle state according to an embodiment of the disclosure.

FIG. 4 is a view illustrating a method of terminating a connection of an unauthenticated terminal if the terminal switches to an idle state according to an embodiment of the disclosure.

FIG. 4 shows a process of preventing unnecessary resource waste of a network by a method for releasing the terminal 110 connected without authentication if the terminal 110 switches to an idle state.

Referring to FIG. 4, when the terminal 110 is provided with the RLOS by performing the attachment process for the RLOS and establishing a PDN connection for the RLOS, as described in the above embodiments, at operations 410, 415, 420, 425, 430, 435, 440, 445, 450, and 455), the E-UTRAN 120 operates an inactivity timer for the terminal 110, and if no transmission/reception is made with respect to the terminal 110 for a predetermined period of time, at operation 460, the E-UTRAN 120 terminates the radio resource control (RRC) connection to the terminal 110, at operation 465, and transmits an Si UE context release request message to the MME 130, at operation 470, thereby allowing the terminal 110 to switch to an idle mode.

In this case, the terminal 110 connected for the RLOS through the RRC connection performs an implicit detachment without transmitting a detach-request message to the MME 130, at operation 475, and the MME 130, which has received the Si UE context release request, also performs an implicit detachment without transmitting a separate detach-request message to the terminal 110 connected for the RLOS, at operation 480.

Figure 5:
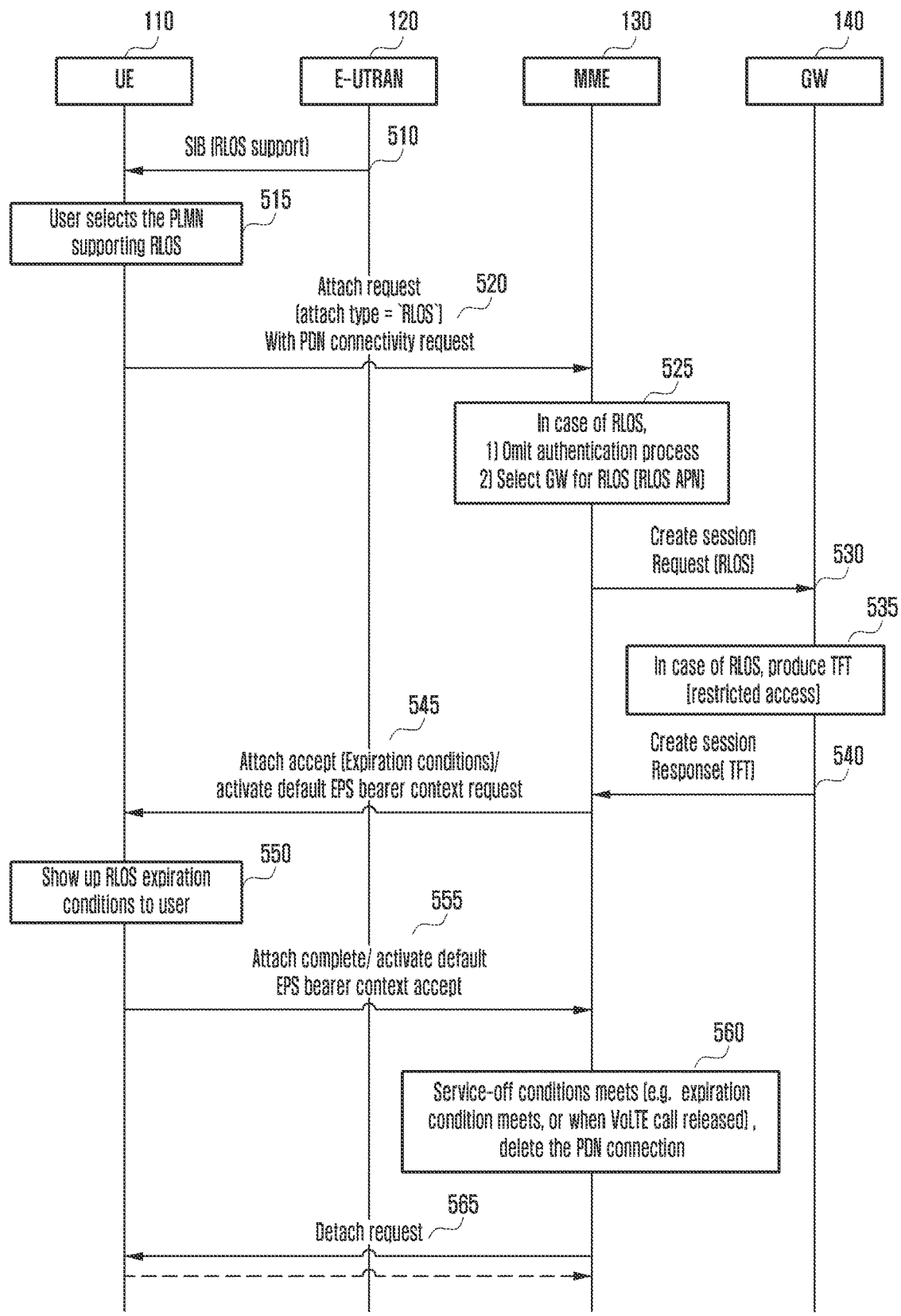
FIG. 5 is a view illustrating a method of informing an unauthenticated terminal of connection termination conditions using an attachment message and terminating a connection of the terminal if the connection termination conditions are satisfied according to an embodiment of the disclosure.

FIG. 5 is a view illustrating a method of informing an unauthenticated terminal of connection termination conditions using an attachment message and terminating a connection of the terminal if the connection termination conditions are satisfied according to an embodiment of the disclosure.

FIG. 5 shows a process of informing an unauthenticated terminal (e.g., the terminal 110) of connection termination conditions using an attachment message and terminating a connection of the terminal if the connection termination conditions are satisfied according to an embodiment.

Referring to FIG. 5, the E-UTRAN 120 broadcasts information indicating the RLOS support using an SIB message if the RLOS is available, at operation 510. Upon receiving the SIB message, the terminal 110 selects an appropriate PLMN from among the detected available PLMNs supporting the RLOS if the RLOS is required, at operation 515.

The terminal 110 transmits an attach-request message to the MME 130 using the selected PLMN, and requests the network connection while informing that the attach-type is the RLOS, at operation 520. For example, "attach type='RLOS'" may be used. In this case, the attach-request message may include the identity of the terminal 110 (e.g., IMEI). The terminal 110 may transmit a PDN connectivity request included in the attach-request message as a piggyback.

The MME 130 may use the IMEI in order to determine whether or not the terminal 110 sending the attach-request message is eligible for the RLOS. A method in which the MME 130 determines whether or not the terminal 110 is eligible for the RLOS using the IMEI will be described as a separate embodiment.

If the attach-request message relates to the RLOS, the MME 130, which has received the attach-request message, selects the GW 140 for the RLOS without an authentication/authorization process for security, at operation 525. The MME 130 transmits a create-session request to the GW 140 selected for the RLOS, thereby making a request for establishing a PDN connection, at operation 530. In this case, the create-session request message includes an RLOS APN or an indication stating that it is for the RLOS. Upon receiving the create-session request, the GW 140 may allocate an IP address, and may produce default EPS bearer context. The default EPS bearer may be configured to produce a TFT so that the terminal 110 can use the traffic only for the RLOS and thus can communicate with a specific server, at operation 535.

The GW 140 transmits TFT information to the MME 130, as described above, at operation 540, and the MME 130 may include expiration conditions for the RLOS in an attach-accept message, and may transmit the same to the terminal 110, at operation 545. The expiration conditions for the RLOS may be acquired on the basis of a value predetermined in the MME 130, and may include all or some of, for example, an allowed service time indicating how long the RLOS is available or an allowed inactivity period indicating how long the RLOS connection can last since the terminal 110 came to the idle mode.

The terminal 110 notifies the user of the expiration conditions for the RLOS, which is received by means of the attach-accept message, through a display of the terminal 110, at operation 550.

Then, the remaining PDN connection establishment process and attachment process are completed, at operation 555.

The MME 130 monitors the user usage status according to the expiration conditions for the RLOS. For example, if the allowed service time is set, the MME 130 determines, through a timer, whether or not the allowed service time has expired, and if the allowed inactivity period is set, the MME 130 determines whether or not the allowed inactivity period has expired since the terminal 110 entered the idle state, thereby continuously checking whether or not the expiration conditions for the RLOS are satisfied.

If the expiration conditions for the RLOS are not satisfied, or if the MME 130 recognizes that the VoLTE call of the terminal 110 using the VoLTE service through the RLOS has been terminated, the MME 130 performs a process of terminating the RLOS for the terminal 110, at operation 560.

The MME 130 may recognize that the VoLTE call has been terminated if a message instructing to delete the QCI=1 bearer due to the call termination is received from the GW 140.

In order to terminate the RLOS, if it is identified that the terminal 110 has one PDN connection, the MME 130 transmits a detach-request message, at operation 565, to the terminal 110, thereby terminating the connection of the terminal 110.

Figure 6:
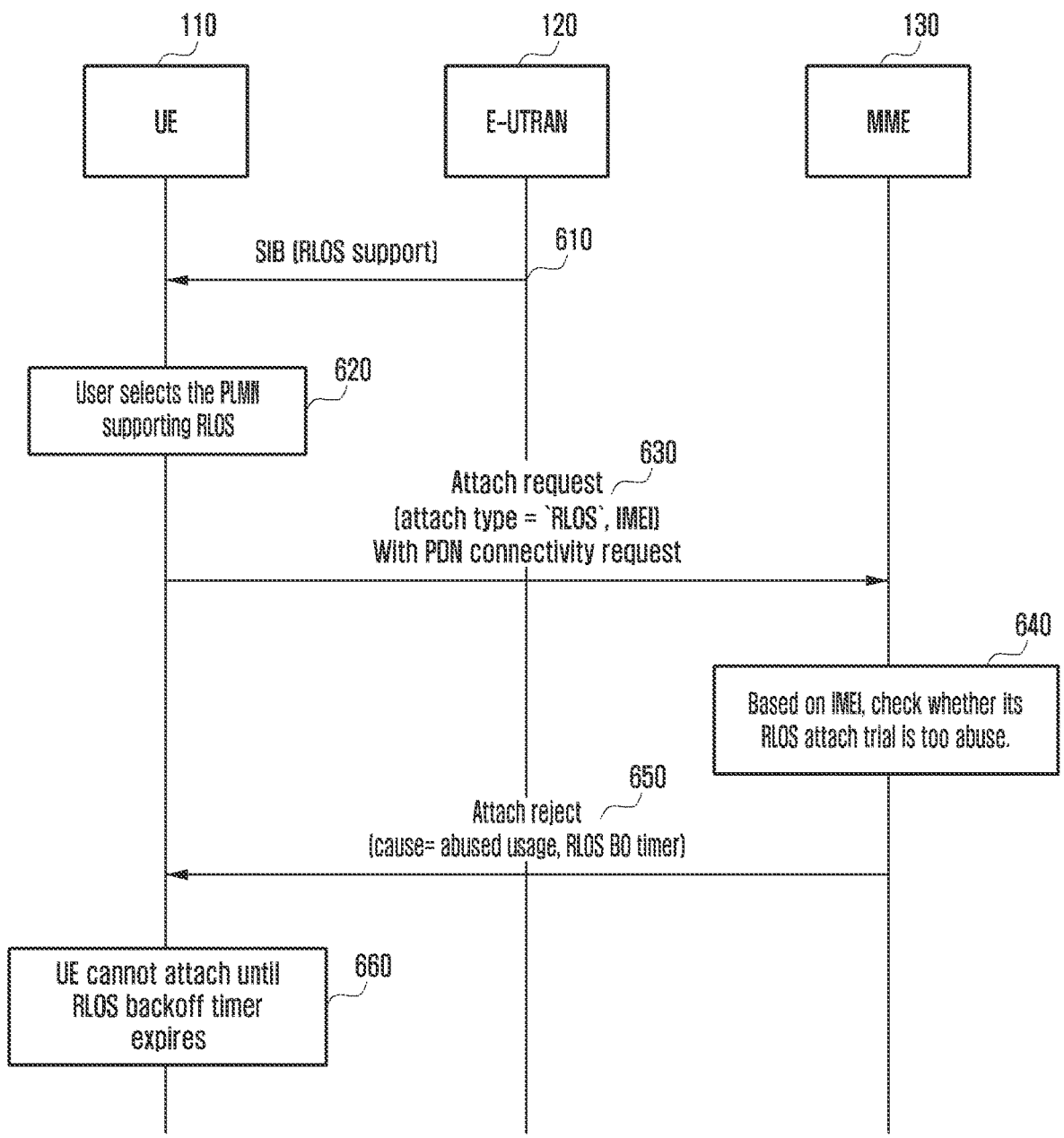
FIG. 6 is a view illustrating a method of restricting a connection of an unauthenticated terminal if the terminal excessively accesses a network according to an embodiment of the disclosure.

FIG. 6 is a view illustrating a method of restricting connection of an unauthenticated terminal if the terminal excessively accesses the network according to an embodiment of the disclosure.

FIG. 6 shows a process of restricting a connection of an unauthenticated terminal (e.g., the terminal 110) if the terminal 110 excessively accesses the network according to an embodiment.

Referring to FIG. 6, the E-UTRAN 120 broadcasts information indicating the RLOS support using an SIB message if the RLOS is available, at operation 610. Upon receiving the SIB message, the terminal 110 selects an appropriate PLMN from among the detected available PLMNs supporting the RLOS if the RLOS is required, at operation 620.

The terminal 110 transmits an attach-request message to the MME 130 using the selected PLMN, and requests the network connection while informing that the attach-type is the RLOS, at operation 630. For example, "attach type='RLOS'" may be used. In this case, the attach-request message may include the identity of the terminal 110 (e.g., IMEI). The terminal 110 may transmit a PDN connectivity request included in the attach-request message as a piggyback.

The MME 130 may use the IMEI in order to determine whether or not the terminal 110 sending the attach-request message is eligible for the RLOS, at operation 640. For example, when the terminal 110 corresponding to the received IMEI accesses the network for the RLOS, the MME 130 may increase a counter by one, thereby recording the number of connections of the corresponding terminal 110 for the RLOS within a predetermined period of time. In this case, if the number of connections of the terminal 110 exceeds a number predetermined by the provider within a predetermined period of time, the MME 130 rejects the attachment attempt.

Alternatively, in the case where the terminal 110 is connected for the RLOS and is released from the network, the MME 130 records information on how long the terminal 110 corresponding to the IMEI has been provided with the service, and if the terminal 110 of the same IMEI attempts to access the network, the MME 130 rejects the connection if the usage time of the terminal 110 exceeds an RLOS service time predetermined by the provider, within which one terminal can be provided with the RLOS.

In the case where the MME 130 rejects the connection attachment attempt of the terminal 110, the MME 130 may transmit an attach-reject message to the terminal 110, and the attach-reject message may include "error cause=abused usage" stating that connection has been rejected because the RLOS service connections limit was exceeded, at operation 650. In this case, the MME 130 may include an RLOS back off timer value, as information on the period of time for which the RLOS connection is blocked, in the attach-reject message, and may transmit the same to the terminal 110.

If the RLOS back off timer value is not provided to the terminal 110, the RLOS back off timer value may follow a default value.

The terminal 110 does not make an attachment attempt for the RLOS to the same PLMN before the RLOS back off timer expires, at operation 660.

Figure 7:
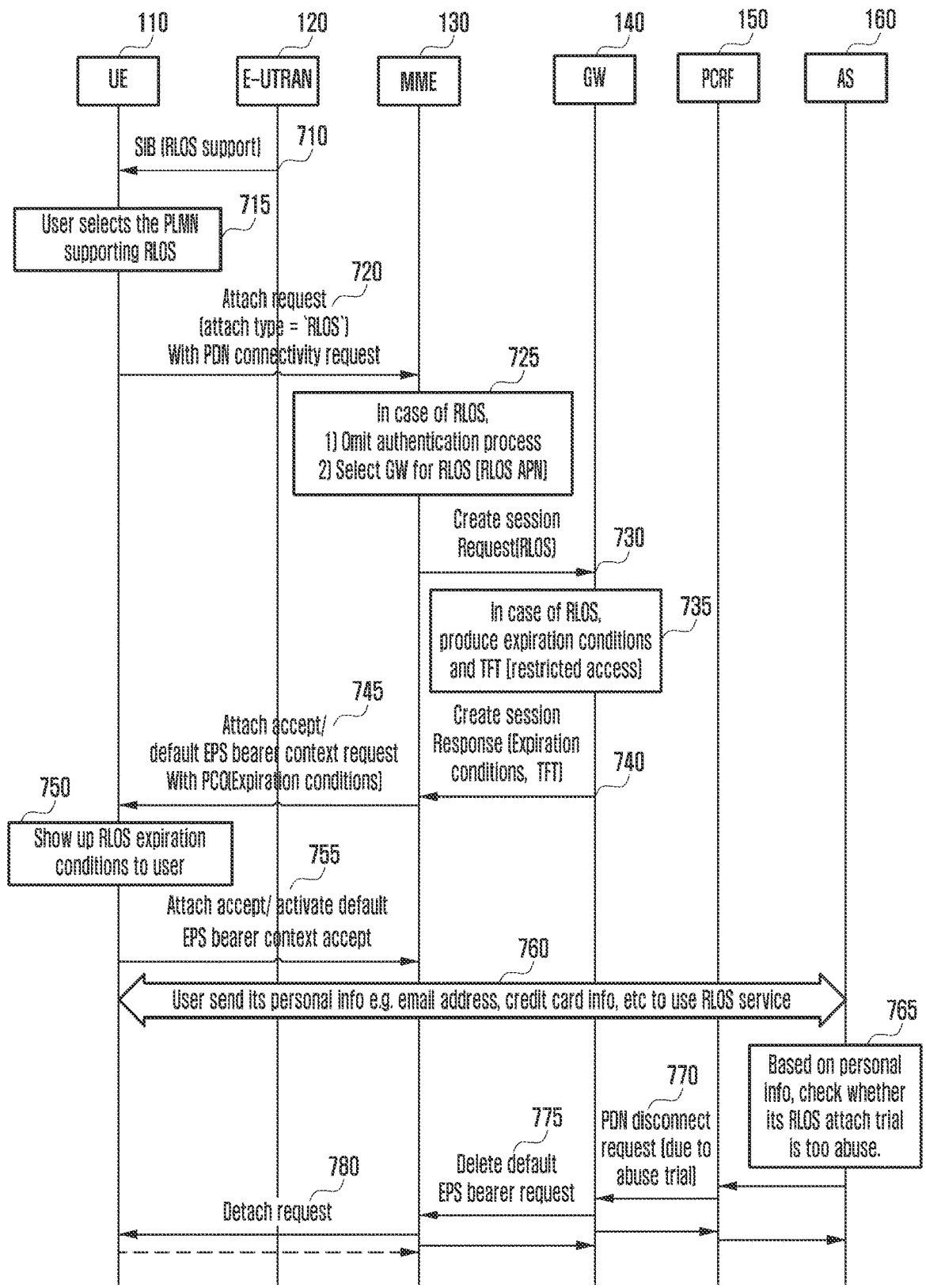
FIG. 7 is a view illustrating a method of restricting a connection of an unauthenticated terminal if the terminal excessively accesses a network according to an embodiment of the disclosure.

FIG. 7 is a view illustrating a method of restricting a connection of an unauthenticated terminal if the terminal excessively accesses the network according to an embodiment of the disclosure.

FIG. 7 shows a process of restricting a connection of an unauthenticated terminal (e.g., the terminal 110) if the terminal 110 excessively accesses the network according to an embodiment.

Referring to FIG. 7, the terminal 110 performs an attachment process for the RLOS and establishes a PDN connection for the RLOS as described in the above embodiments, at operations 710, 715, 720, 725, 730, 735, 740, 745, 750, and 755).

The terminal 110 connects to the AS 160 (e.g., captive portal server) for the RLOS through the PDN connection, and enters user information for using the application service, at operation 760. For example, the terminal 110 enters an email address, a username, user's credit card information, or the like. Based on the information, the AS 160 determines whether or not the user is entitled to use the RLOS, at operation 765.

For example, when the corresponding user accesses the network for the RLOS, the AS 160 may increase a counter by one, thereby recording the number of connections of the corresponding user for the RLOS within a predetermined period of time. In this case, if the number of connections of the terminal 110 exceeds a number predetermined by the provider within a predetermined period of time, the AS 160 terminates the RLOS and informs the user of the same, thereby performing a process of terminating the PDN connection for the RLOS.

Alternatively, in the case where the terminal 110 is connected for the RLOS and is released, the AS 160 records information on how long the user has been provided with the RLOS, and when the same user attempts to make a connection for the RLOS, if the usage time of the user exceeds an RLOS service time predetermined by the provider, within which one terminal can be provided with the RLOS, the AS 160 stops the RLOS and informs the user of the same, thereby performing a process of terminating the PDN connection for the RLOS.

In order to terminate the PDN connection for the RLOS, the AS 160 makes a request to the PCRF 150 for terminating the corresponding RLOS flow, and the PCRF 150 makes a request to the GW 140 for terminating the PDN connection, at operation 770. Accordingly, the GW 140 transmits a delete-default EPS bearer request message to the MME 130, at operation 775, and in order to terminate the RLOS, the MME 130 identifies that the terminal 110 has one PDN connection and transmits a detach-request message, at operation 780, to the terminal 110, thereby terminating the connection of the terminal 110.

Figure 8:
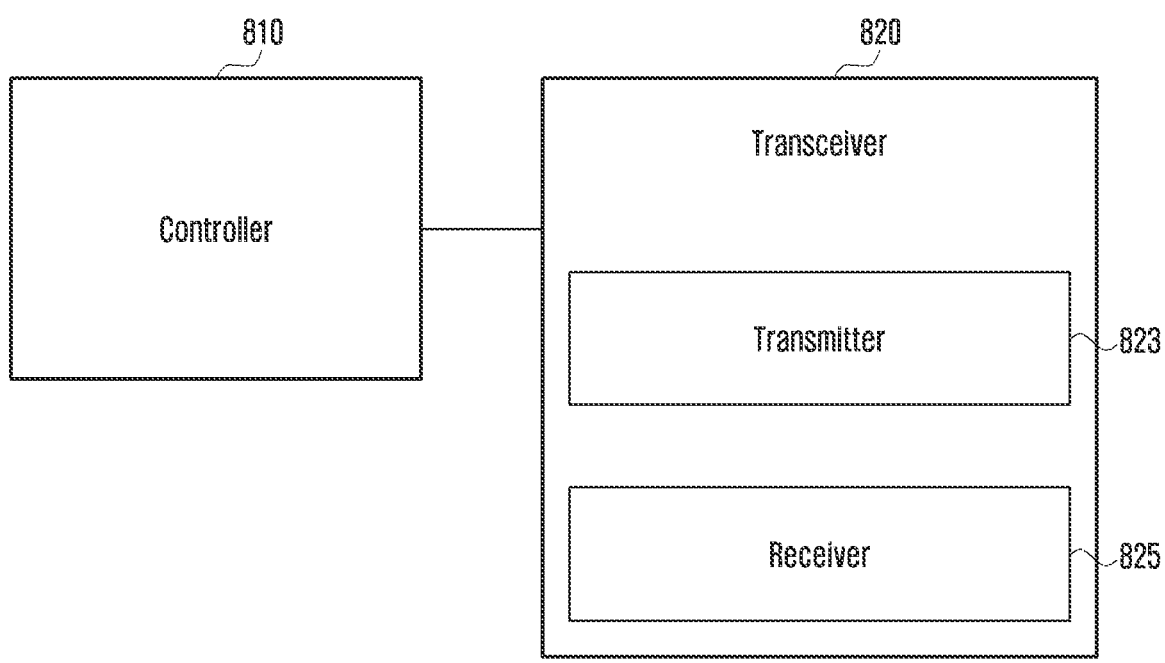
FIG. 8 is a view illustrating a configuration of a terminal according to an embodiment of the disclosure.

FIG. 8 is a view illustrating a configuration of a terminal according to an embodiment of the disclosure.

Referring to FIG. 8, the terminal according to an embodiment may include a transceiver 820 and a controller 810 for controlling the overall operation of the terminal. In addition, the transceiver 820 may include a transmitter 823 and a receiver 825.

The transceiver 820 may transmit and receive signals to and from other network entities.

The controller 810 may control the terminal so as to perform one of the operations described in the above embodiments. It should be noted that the controller 810 and the transceiver 820 are not necessarily implemented as separate modules, and may be implemented as a single component such as a single chip. The controller 810 and the transceiver 820 may be electrically connected to each other. In addition, for example, the controller 810 may be a circuit, an application-specific circuit, or at least one processor. Further, the operations of the terminal may be realized by providing a memory device storing the corresponding program code to a certain component in the terminal.

Figure 9:
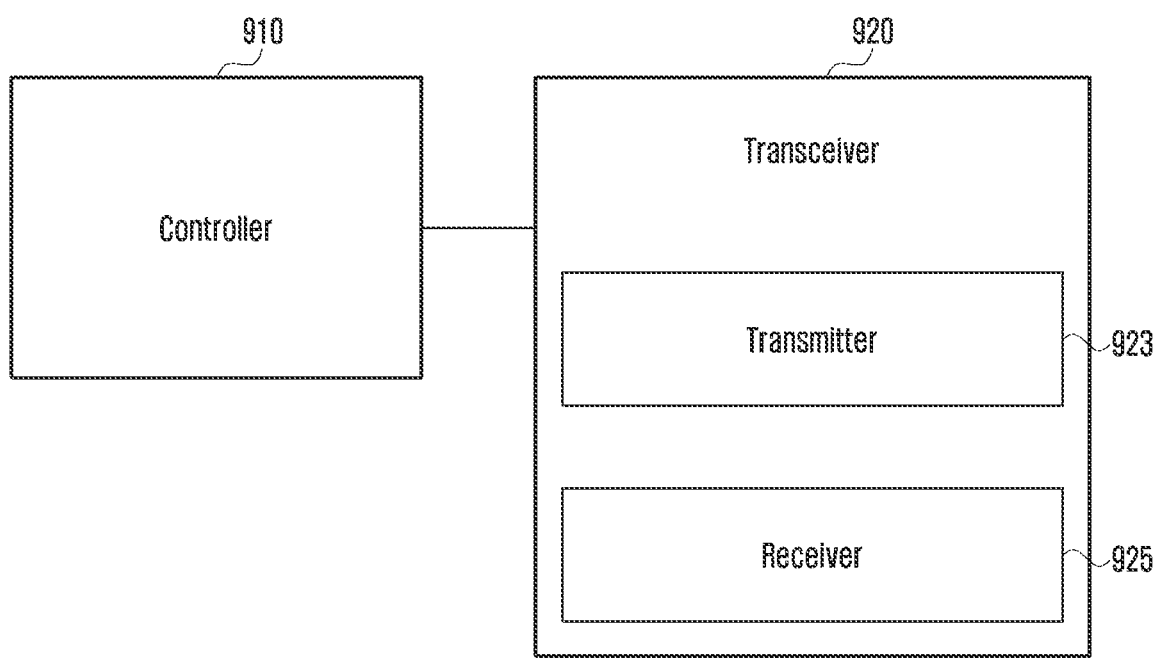
FIG. 9 is a view illustrating a configuration of a base station according to an embodiment of the disclosure.

FIG. 9 is a view illustrating a configuration of a base station according to an embodiment of the disclosure.

Referring to FIG. 9, the base station according to an embodiment may include a transceiver 920 and a controller 910 for controlling the overall operation of the base station. In addition, the transceiver 920 may include a transmitter 923 and a receiver 925.

The transceiver 920 may transmit and receive signals to and from other network entities.

The controller 910 may control the base station so as to perform one of the operations described in the above embodiments. It should be noted that the controller 910 and the transceiver 920 are not necessarily implemented as separate modules, and may be implemented as a single component such as a single chip. The controller 910 and the transceiver 920 may be electrically connected to each other. In addition, for example, the controller 910 may be a circuit, an application-specific circuit, or at least one processor. Further, the operations of the base station may be realized by providing a memory device storing the corresponding program code to a certain component in the base station.

In addition, although it is not shown in the drawings, the network entity, such as the MME, the GW, the PCRF, the AS, or the like, according to an embodiment may include a transceiver and a controller for controlling the overall operation of the network entity. In addition, the transceiver may include a transmitter and a receiver. The transceiver may transmit and receive signals to and from other network entities. The controller may control the network entity so as to perform one of the operations described in the above embodiments. It should be noted that the controller and the transceiver are not necessarily implemented as separate modules, and may be implemented as a single component such as a single chip. The controller and the transceiver may be electrically connected to each other. In addition, for example, the controller may be a circuit, an application-specific circuit, or at least one processor. Further, the operations of the network entity may be realized by providing a memory device storing the corresponding program code to a certain component in the network entity.

It should be noted that the view illustrating the configuration of the terminal, the view illustrating an example of the control/data signal transmission method, the view illustrating an example of the operational procedure of the terminal, or the view illustrating the configuration of the terminal device, which are shown in FIGS. 1 to 9, are not intended to limit the scope of the disclosure. That is, it should not be interpreted that all the elements, entities, or operations illustrated in FIGS. 1 to 9 are essential elements for the implementation of the disclosure, and the disclosure can be implemented by only some elements without departing from the subject matter of the disclosure.

The above described operations of the base station or UE may be implemented by providing a memory device storing corresponding program codes in any constituent unit of the base station or UE apparatus. That is, the controller of the base station or UE may perform the above described operations by reading and executing the program code stored in the memory device by means of a processor or a CPU.

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an ASIC.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first core network entity in a wireless communication system, the method comprising:
receiving, from a second core network entity, a message including information related to a restricted service;
identifying that a duration of a packet data network (PDN) connection for the restricted service reaches a configured time for the PDN connection for the restricted service; and
transmitting, to the second core network entity, a request message for deactivating a bearer of the PDN connection for the restricted service, based on the duration of the PDN connection for the restricted service reaching the configured time.

2. The method of claim 1, wherein the receiving the message including information related to the restricted service further comprises:
creating a bearer context based on the receiving of the message; and
transmitting, to the second core network entity, a create session response message including information on the bearer associated with the bearer context.

3. The method of claim 1, further comprising:
receiving, from the second core network entity, a response message as a response to the request message.

4. The method of claim 1, wherein the information related to the restricted service includes at least one of an identity of a terminal or an access point name (APN) for the restricted service.

5. A method performed by a terminal in a wireless communication system, the method comprising:
transmitting, to a core network entity, an attach request message including information related to a restricted service;
receiving, from the core network entity, an attach accept message as a response to the attach request message, the attach request message including information on a bearer for the restricted service; and
receiving, from the core network entity, a request message for deactivating the bearer of a packet data network (PDN) connection for the restricted service, in case that a duration of the PDN connection for the restricted service reaches a configured time for the PDN connection for the restricted service.

6. The method of claim 5, wherein the information related to the restricted service comprises at least one of an identity of a terminal or an attach type field set to restricted service.

7. The method of claim 5, further comprising:
releasing the bearer based on the request message.

8. The method of claim 5, further comprising:
transmitting, to the core network entity, a response message as a response to the request message.

9. A first core network entity in a wireless communication system, the first core network entity comprising:
a transceiver; and
a controller configured to:
receive, from a second core network entity via the transceiver, a message including information related to a restricted service,
identify that a duration of a packet data network (PDN) connection for the restricted service reaches a configured time for the PDN connection for the restricted service, and
transmit, to the second core network entity via the transceiver, a request message for deactivating a bearer of the PDN connection for the restricted service, based on the duration of the PDN connection for the restricted service reaching the configured time.

10. The first core network entity of claim 9, wherein the controller is further configured to:
create a bearer context based on the receiving of the message, and
transmit, to the second core network entity via the transceiver, a create session response message including information on the bearer associated with the bearer context.

11. The first core network entity of claim 10, wherein the information related to the restricted service includes at least one of an identity of a terminal or an access point name (APN) for the restricted service.

12. The first core network entity of claim 9, wherein the controller is further configured to receive, from the second core network entity via the transceiver, a response message as a response to the request message.

13. A terminal in a wireless communication system, the terminal comprising:
a transceiver; and
a controller configured to:
transmit, to a core network entity via the transceiver, an attach request message including information related to a restricted service,
receive, from the core network entity via the transceiver, an attach accept message as a response to the attach request message, the attach request message including information on a bearer for the restricted service, and
receive, from the core network entity via the transceiver, a request message for deactivate the bearer of a packet data network (PDN) connection for the restricted service, in case that a duration of the PDN connection for the restricted service reaches a configured time for the PDN connection for the restricted service.

14. The terminal of claim 13, wherein the information related to the restricted service comprises at least one of an identity of a terminal or an attach type field set to restricted service.

15. The terminal of claim 14, wherein the controller is further configured to transmit, to the core network entity via the transceiver, a response message as a response to the request message.

16. The terminal of claim 13, wherein the controller is further configured to release the bearer based on the request message.

* * * * *